N. Chapman.
Combined Rake & Tedder
No. 82,382.  Patented Sept. 22, 1868.

Witnesses;
J. Dennis
Wm Dennis

Inventor;
Natha. Chapman

UNITED STATES PATENT OFFICE.

NATHAN CHAPMAN, OF MILFORD, MASSACHUSETTS.

IMPROVEMENT IN HAY-SPREADERS.

Specification forming part of Letters Patent No. 82,382, dated September 22, 1868.

*To all whom it may concern:*

Be it known that I, NATHAN CHAPMAN, of Milford, Worcester county, State of Massachusetts, have invented an Improved Hay Rake and Tedder; and I do hereby declare the following description and accompanying drawings are sufficient to enable any person skilled in the art or science to which it most nearly appertains to make and use my said invention or improvements without further invention or experiment.

The nature of my invention and improvements consists in arranging the machine in such a manner, and providing it with such devices, that it may be used either as a hay-rake or tedder, and may be readily changed from the one into the other; also, in giving to the rake certain peculiar movements designed to make it carry the gathered hay more lightly and easily.

In the following more exact description of my invention reference is made to the accompanying drawings, forming part of this specification, of which—

Figure 1:
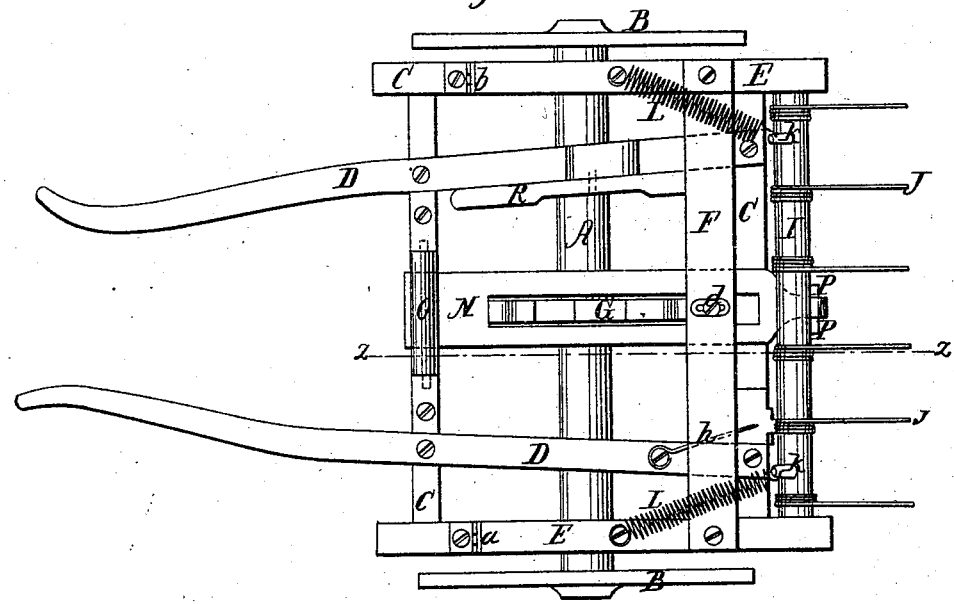
Figure 2:
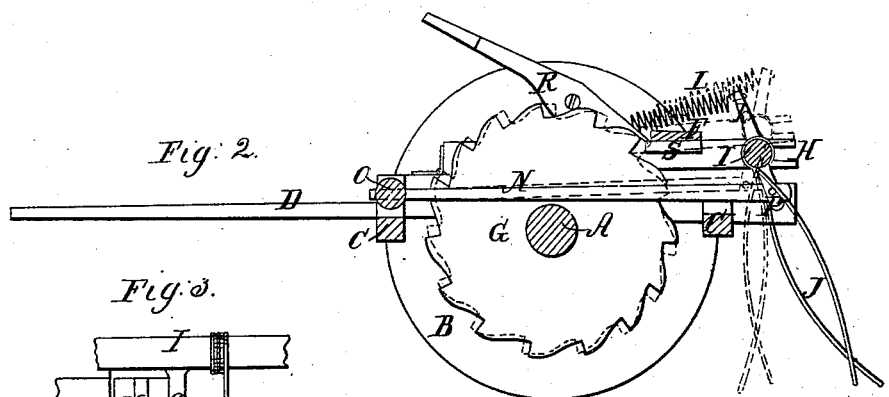
Figure 3:
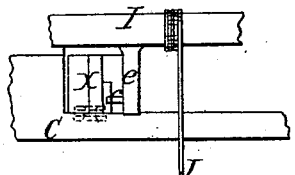

Figure 1 is a plan or top view of my improved hay rake and tedder; Fig. 2, a sectional elevation of the same at the line $zz$ on Fig. 1; and Fig. 3, a view, from the rear, of a special device, to be presently explained.

In these drawings, A is the axle, and B B the wheels, supporting a rectangular frame, C, upon which are fastened the shafts D D. These parts form the carriage of the machine.

The wheels B B are firmly fixed upon the axles, so that it turns with them, having journals which turn in boxes provided for them on the frame C.

A top frame, consisting of the side bars E E and the cross-bar F, is hinged at $a$ and $b$ upon the frame C, and has its rear end raised and let fall alternately, when the machine is in motion, by the teeth of the wiper-wheel G, fixed and fastened upon the axle A.

In the rear ends of the bars E, horizontal scores or open boxes H are formed to receive the journals at the ends of the rake-head I, which is provided with spring-teeth J J, &c.

From the upper side of the head I project the arms K K, to the upper part of which are attached the springs L L, having their opposite or fore ends fastened to the bars E E.

The traversing bar N is arranged to slide or traverse in a slot in the roller O, pivoted upon the front bar of the frame C; and said bar N has a slot or opening through it, within which the wiper-wheel G turns. The rear end of this bar N is pivoted between the arms P P, projecting downward from the rake-head I, and is traversed in one direction by the teeth of the wheel G, which act against the front end of the opening through it within which the said wheel turns, and in the other direction by the springs L L, acting upon the rake-head I through the arms K K.

The lever R, having its fulcrum supported by the shaft D, and its lower end projecting beneath the bar F, enables the operator to raise the bars E E and the rake, for the rake to clear itself by dropping the gathered hay, or for any other purpose.

When the machine is used as a rake, a wiper-seat, S, is placed beneath the cross-bar F, and secured and made adjustable by a screw, $d$, passing through a slot in the bar, and the rake is so placed in the bars E E that the teeth will curve forward. The machine being then started or drawn forward, so as to turn the wheels and axle, a tooth of the wheel G drives forward the bar N, and this bar, acting upon the arms P P, turns the head I, so that the points of the rake-teeth are drawn forward relatively to the carriage of the machine; but when this forward movement of the teeth is about half accomplished another tooth of the wheel G, acting against the wiper-seat S, properly adjusted for that purpose, raises the top frame, and with it the rake, so that first a forward movement, and then a forward and upward movement, are given to the rake-teeth, relatively to the carriage, as the latter advances.

As soon as the bar N is released by the operating-tooth, or the tooth has passed it, the springs L L draw forward the arms K K, which throw the points of the teeth backward; and the top frame being arranged so as to be released from the tooth of the wheel G at about the same time, or directly after, the rake immediately drops to its first position, relatively to the machine or carriage; and the different parts of the machine are to be so proportioned and adjusted that the teeth will drop to about the same position, relatively to the ground, that they occupied when the upward movement, just described, was commenced.

The above-described succession of movements being continually repeated as the machine is drawn forward, the hay is lifted along and kept light and loose, instead of being compressed into a mass near the ground, so as to clog the rake.

When used as a tedder, the head I is reversed or changed end for end, so that the teeth curve backward, and the wiper-seat S removed or adjusted, so that a tooth of the wheel G will release and drop the top frame and the head I just before another tooth releases the bar N. Then, as the machine advances, one tooth of the wheel G raises the top frame and the head I; and directly after, another tooth of the wheel draws forward the points of the teeth in said head, and these teeth being allowed to drop just before the bar N is released, as above described, when it is released, the springs L L cause the points of the teeth to fly backward, and thus throw back and scatter the mown grass into which they were dropped. This succession of movements will, of course, be continually repeated as the machine is drawn forward.

If preferred, the cross-bar F may be set clear of the wheel G, and a block, X, (shown in Fig. 3,) hinged upon the rear bar of the frame C, a portion of its rear face being inclined upward and forward, and having a vertical score extending from the upper edge of this inclined face down through its side.

An arm, e, extending down from the head I, is provided with a pin, c, projecting horizontally from it, so as to come in contact with the inclined face of the block as the head is is drawn around by the bar N, and thus raise the head as required. When the pin c reaches the vertical score it will, of course, allow the head to drop, and the block X, being hinged, as shown in dotted lines, to the front edge of the bar on which it is set, it will turn and allow the pin c to escape from the score when the head I is turned by the springs L L.

There may be two blocks, and also two arms, if required—one to give the proper movements for raking, and the other for tedding; or the block and its parts may be adjustable for that purpose.

A spring, h, fastened upon the shaft D, presses the block X back to its original position when it has been lifted by the escape of the pin c.

What I claim as my invention and improvement in the above-described horse hay rake and tedder, is—

1. Giving the rake-teeth, when raking, a forward and an upward movement and a backward and downward movement, in regular succession, by means of the toothed wiper-wheel G, traversing bar N, wiper-seat S, and springs L L, constructed and arranged to operate substantially as described.

2. Giving the teeth, when tedding, a forward and upward movement and a downward and a backward movement in succession, by means of the toothed wiper-wheel G, traversing bar N, and inclined plane and groove on the block X, substantially as described.

3. Hinging the inclined block X so that the rear end will rise and let the pin or roller pass under it as it moves backward, and catch on the top as it moves forward, substantially as described.

NATHAN CHAPMAN.

Witnesses:
  J. DENNIS, Jr.,
  WM. DENNIS.